Figure 1:
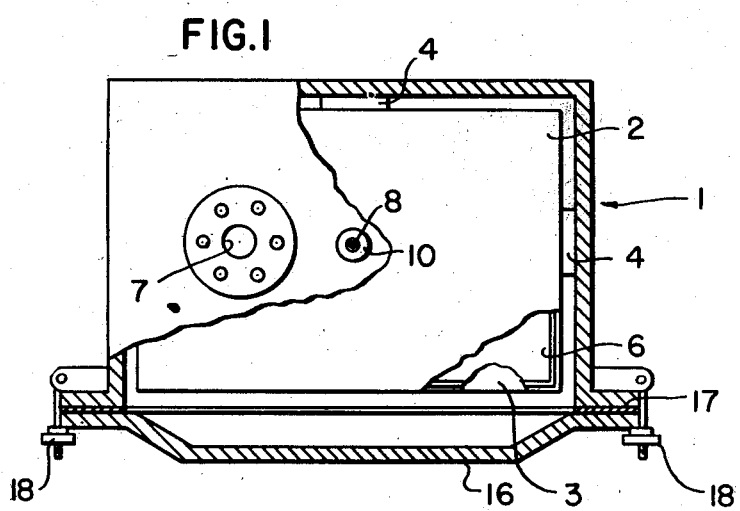

July 4, 1950

S. BRADBURY, III 2,513,991

PROCESS FOR THE DESICCATION OF AQUEOUS
MATERIALS FROM THE FROZEN STATE
Filed March 19, 1946

Samuel Bradbury, 3RD
*INVENTOR.*

BY

Adams, Forward and McLean
ATTORNEYS

Patented July 4, 1950

2,513,991

UNITED STATES PATENT OFFICE 2,513,991

PROCESS FOR THE DESICCATION OF AQUEOUS MATERIALS FROM THE FROZEN STATE

Samuel Bradbury, 3rd., Conshohocken, Pa., assignor to Lyophile-Cryochem Corporation, Baltimore, Md., a corporation of Maryland Application March 19, 1946, Serial No. 655,588

1 Claim. (Cl. 34—1)

This invention relates to improvements in the desiccation of aqueous materials from the frozen state, and more particularly, to improvements by which the rate of desiccation may be materially increased by increase of the rate at which heat is supplied to the evaporating surface of the frozen material without overheating either the dried portions of the material, with consequent damage thereto, and without supplying heat to the frozen portion so rapidly as to raise its temperature to the point where melting or softening might occur.

Desiccation of various materials, such as biologicals, including sera, vaccines, viruses, microorganisms, antibiotics and the like, foodstuffs, such as fruit juices, meat, vegetables, and the like, and labile chemicals are known. In general, they involve freezing the material and subliming the ice therefrom by the application of a high vacuum until substantially all of the water is removed therefrom and subsequently raising the temperature of the material to room temperature or to even higher temperatures such as 50 to 60° C. to remove the last traces of the water, and to reduce the water content of the material to the low level required for stability on storage, nearly always below 2% and usually about 0.5% or less.

The process is carried out at a very low pressure or high vacuum, usually of the order of 50 to 700 microns, although certain materials, under certain conditions, may be desiccated at higher pressures, for example, 2 to 3 mm. The requirement as to pressure is that it be sufficiently low, below the vapor tension of the fozen material, so that the frozen water sublimes at a rate sufficiently high to keep the material frozen, or at least in a congealed, i. e., plastic, state. Maintenance of this high vacuum involves the removal of the water vapor about as fast as it is generated. This is accomplished by condensing the water vapor on a cold condenser maintained at a temperature below that of the frozen material, by the use of absorbents, which absorb the water vapor, in these two instances a vacuum pump being used to remove non-condensable gases and keep the total pressure in the system below the vapor pressure of the frozen material, or by the use of a pump of capacity adequate to remove both the non-condensable gases and generated water vapor. Because of the efficiency of the water vapor removal means which have been developed and used and which are available with adequate capacity to remove the water vapor faster than it can be generated in any process heretofore available, the essential limitation on speed of the drying operation has been the rate at which it has been possible to supply heat to the frozen material.

To convert frozen water to vapor it is necessary that the latent heat of sublimation be supplied. If heat is supplied to frozen material at an insufficient rate, the desiccation slows down, until there is a balance between the rate at which heat is supplied and the rate at which it is absorbed by the latent heat of sublimation of the ice which is sublimed. In the desiccation, the water vapor appears to be generated at the interface of the frozen material. Initially, it is from the exterior surface, but as the desiccation proceeds, the surface of the frozen layer recedes, with the part of the material from which the ice has been sublimed being relatively dry, for example, with a moisture content of the order of a few percent or less, and this phenomenon appears to continue until the surface of the frozen material has receded completely through the layer of the material being dried. For sublimation to occur, therefore, it is necessary to supply the heat to the surface of the frozen material, initially to the exposed surface and then progressively to the surface as it recedes through the frozen layer. Heat supplied to other portions of the material is not effective in promoting sublimation except as it is conducted to the surface of the frozen material. Heretofore, heat has generally been supplied by exposing containers with frozen material in them to a suitable source of heat such as a warm bath or the atmosphere, radiant heat, by placing the material in heated, jacketed vacuum chambers, or the like. In all cases the rate at which the heat can be so supplied has been limited by the capacity of the frozen material, or where heat is supplied as by radiation to the exposed surface of the material, the dried material, to conduct the heat to the frozen surface without causing undue heating of the frozen material, thus bringing about melting, or undue heating of the dried material, thus bringing about deterioration.

While the major vaporization of the water takes place at the receding iced surface, some takes place from the portion of the material which no longer contains any ice. Thus, with most products of this type, the material appears to be dry when it still contains some 15 to 25% of water, and with that water content can no longer be said to be frozen in that there is insufficient water present to form anything resembling ice. The water is removed from this portion of the material, as well as from the receding ice surface, as the final moisture content of the product must be reduced well below this level for effective preservation. Thus, at any stage of the process between the initial stage and the stage in which nearly all of the water is removed from the product there is present a portion of the material which is frozen in the sense that there is ice or the like present and a portion of the material which is either completely dry or is dry in appearance but has some water present, for example, 5 to 25%, which water is not, presumably, present in the form of ice but is present in some other form.

In accordance with the present invention, the rate at which the drying from the frozen state can be carried out is increased by supplying heat adjacent to the surface of the ice layer, where the major portion of the evaporation takes place, by subjecting the material to a high frequency electric field which serves to generate heat adjacent to the surface of the receding ice layer because of the presence, in the material from which the ice has just receded, of moisture in quantities ranging from around 5 to 25%, which generates heat upon the imposition of the high frequency electric field, in contrast with the ice mass and with the portions of the material which are completely dried. By generating the heat in the immediate locality of the surface of the ice layer, it is rapidly conducted to the ice layer to supply the latent heat of sublimation at the place where the sublimation is actually taking place. This is in contrast with previous methods of supplying the latent heat of sublimation in operations of this kind in which the heat has had to be conducted from one surface or the other of the material undergoing desiccation to the surface of the ice layer, which has required conduction either through a substantial layer of frozen material or through a substantial layer of partially or completely dried material.

The marked advantage of the procedure is that it permits the application of heat at the place where it is required with a minimum gradient from the point of application or generation, and thus permits rapid desiccation without risk of either causing frozen material to melt because of a requirement of conductance of heat through a layer of frozen material or overheating dried material because of a requirement of conductance of heat through a layer of dried or almost dried material.

To operate the process of desiccation from the frozen state successfully, that is, to eliminate the water at a rate approximating that at which it is generated, it is, as previously pointed out necessary to use a high vacuum of the order of 50 to 750 microns, in most operations. With a number of products, operation at about 200 microns gives optimum results. Toward the end of the operation when most of the water has been removed the pressure may drop to as low as 50 microns and in some cases to even lower levels.

It is necessary in carrying out the process with dielectric heating to avoid ionization or arcing within the vacuum chamber, that is, in the space in which the electric field is applied. Because of the requirement as to pressure within the chamber, necessary to operation of the process, it is necessary to use high frequencies in excess of 200 megacycles, and advantageously in excess of 400 megacycles. So far as is known there is no upper limit to the frequency which can be used except as a limit is imposed by the oscillating tubes available for providing necessary high frequency current.

The process may be carried out in any convenient apparatus, and requires little modification of the apparatus which is currently used. One type which is more or less widely used consists of a large chamber capable of being sealed with a vacuum type seal and provided with a large outlet leading to a cold condenser and thence to a vacuum pump. The vacuum chamber is provided with shelves and the material to be desiccated may either be placed in trays on the shelves, or in glass or other containers and then be placed on the shelves. The material is frozen in the trays or containers either before placing them in the chamber or after placing them in the chamber and by the use of a refrigerant or by autorefrigeration induced by the application of an appropriate vacuum, all as is well known to those skilled in the art. When the frozen material is in place the vacuum chamber is closed and the vacuum pump is started. The vacuum pump removes the permanent gases from the system and the water vapor which is generated is condensed on the cold condenser which, of course, is maintained at a temperature lower than that of the frozen material to be desiccated. To modify this well known apparatus for practicing the present invention merely requires the placing of plates within the chamber, insulated from each other, in such position that the frozen material is between them, the plates being connected to a suitable source of high frequency current. Upon supplying the high frequency current to these plates the high frequency electric field which serves to generate the heat within the material as directed above is established. Little or no heat is generated in the metal or glass portions of the equipment nor in the material which is in a frozen state nor in those portions of the material which are dry. The only heat generated is in those portions of the material which contain a small quantity of water and which as previously noted are adjacent to the receding ice layer in the material undergoing desiccation.

Figure 2:
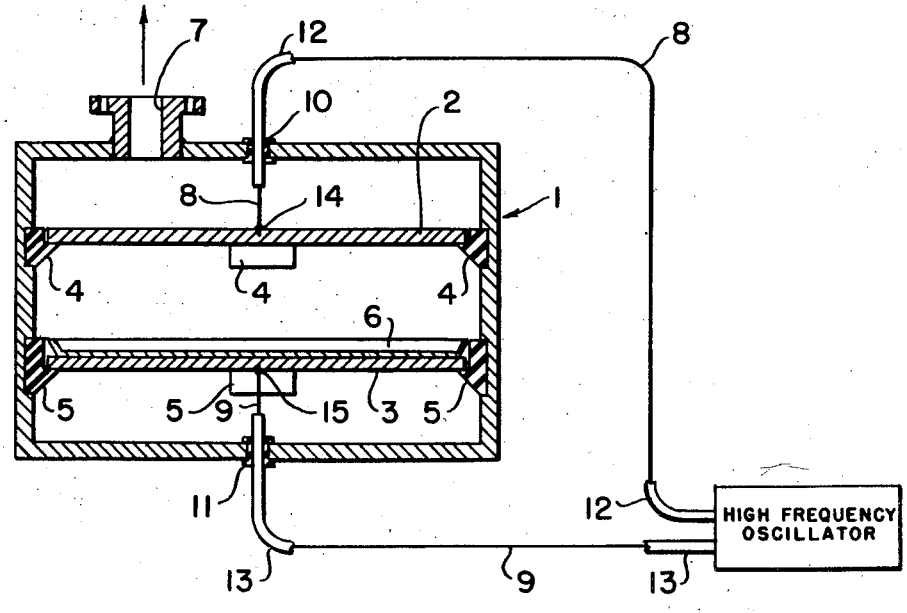

Figure 1 is a top view of a vacuum chamber suitable for carrying out the process of my invention. Figure 2 shows a cross-sectional front view of the vacuum chamber shown in Figure 1 and includes in diagrammatic manner appropriate connections to a high frequency oscillator.

Referring to Figure 2 apparatus suitable for carrying out the process of my invention comprises a vacuum chamber 1 in which are positioned an upper electrode 2 and a lower electrode 3. Both electrodes are made of suitable electrical conducting material, and are supported by electrically insulated supports 4 and 5. The material to be desiccated is placed in the chamber 1 on lower electrode 3 in tray 6.

Vacuum chamber 1 is equipped with a suitable port 7 to which is connected evacuating apparatus, not illustrated.

Electrodes 2 and 3 are separately connected to a high frequency oscillator by suitable means such as the high frequency conductors 8 and 9, illustrated in Figure 2. Conductors 8 and 9 are passed through the walls of vacuum chamber 1 by means of electrically insulated bushings 10 and 11, respectively. Conductors 8 and 9 are connected to electrodes 2 and 3, respectively, at points 14 and 15.

Figure 1 shows the vacuum chamber with the top partially cut away exposing upper electrode 2. Upper electrode 2 is further cut away showing tray 6 which also is partially cut away to show electrode 3 on which it rests.

Figure 1 also illustrates a suitable removable front cover 16 with a gasket 17 and suitable fastening means 18. The front cover may be hinged or completely removable.

If desired each shelf in the vacuum chamber may be used as one of the electrodes or plates and the other electrode or plate may be placed above it, so that the material to be desiccated is between the two electrodes or plates. Proper insulation must, of course, be provided.

If desired the dielectric heat generated as described may be supplemented by heat provided by jacketing the vacuum chamber and circulating a heating medium through the jacket, by having the shelves hollow so that a heating medium may be circulated therethrough, or by the inclusion of radiant heaters or the like within the vacuum chamber in accordance with known procedures.

I claim:

In the process of desiccating aqueous materials by removal of water therefrom by the application of high vacuum to the material after freezing it, the steps of freezing the material and subjecting the frozen material to a high vacuum while supplying latent heat of sublimation to the material by subjecting it to a high frequency electric field with a frequency in excess of 200 megacycles.

SAMUEL BRADBURY, 3RD.

REFERENCES CITED

The following references are of record in the file of this patent:

UNITED STATES PATENTS

| Number | Name | Date |
|---|---|---|
| 2,302,253 | Reichel et al. | Nov. 17, 1942 |
| 2,325,652 | Bierwirth | Aug. 3, 1943 |
| 2,396,561 | Flosdorf | Mar. 12, 1946 |
| 2,427,786 | Hoyler | Sept. 23, 1947 |
| 2,442,114 | Brown | May 25, 1948 |

OTHER REFERENCES

"Classification Chart Aids Dryer Selection," by W. R. Marshall, Jr., pages 71–76 of Heating, Piping and Air Conditioning, May 1946.

"Radio-Frequency Dehydration of Penicillin Solution," by Brown, Bierwirth and Hoyler. Published Feb. 1946 by R. C. A. Laboratories, Radio Corporation of America, pages 58W–65W.

"Drying by Sublimation" by Earl W. Flosdorf, published in the January 1945 issue of Food Industries, pages 92–95, 168, 170, 172, 174, 176 and 178.

"Research Reports on Quartermaster Contract Projects from July 1, 1944, through June 30, 1945, and July 1, 1945, through October 31, 1945," Massachusetts Institute of Technology Food Laboratory Reports, pages 121 and 125, Wells Bindery, Waltham, Mass., June 1, 1946.